United States Patent [19]
Barter et al.

[11] Patent Number: 6,122,404
[45] Date of Patent: Sep. 19, 2000

[54] VISIBLE STOKES POLARIMETRIC IMAGER

[75] Inventors: James D. Barter, Redondo Beach; Peter H. Y. Lee, Manhattan Beach, both of Calif.

[73] Assignee: TRW Inc., Redondo Beach, Calif.

[21] Appl. No.: 09/085,775

[22] Filed: May 28, 1998

[51] Int. Cl.$^7$ .............................. G06K 9/40; G02B 5/22; H04B 2/10

[52] U.S. Cl. ................... 382/260; 382/254; 382/261; 382/262; 382/263; 382/264; 359/885; 455/213; 455/339; 708/300

[58] Field of Search .................................. 382/173, 260, 382/261, 262, 263, 264, 254; 359/252, 885, 892; 364/724.01; 455/213, 307, 339; 708/300; 333/165

[56] References Cited

U.S. PATENT DOCUMENTS

| | | | |
|---|---|---|---|
| 5,057,843 | 10/1991 | Dubois et al. | 342/25 |
| 5,081,348 | 1/1992 | Siddiqui | 250/225 |
| 5,325,381 | 6/1994 | Paoli | 372/24 |
| 5,343,415 | 8/1994 | Itoh et al. | 382/210 |
| 5,490,075 | 2/1996 | Howard et al. | 364/459 |
| 5,671,264 | 9/1997 | Florent et al. | 382/260 |
| 5,721,632 | 2/1998 | Billmers et al. | 359/252 |
| 5,873,832 | 2/1999 | Maloney et al. | 600/473 |
| 5,930,722 | 7/1999 | Han et al. | 455/502 |

OTHER PUBLICATIONS

Serizawa, et al. "SDH–Based Time Synchronous System for Power System Communications", IEEE, vol. 13, No. 1, Jan. 1998.

J.D. Barter and P.H.Y. Lee, "Polarimetric Optical Imaging Of Scattering Surfaces", Oct., 1966/vol. 35, No. 30, Applied Optics.

*Primary Examiner*—Phuoc Tran
*Assistant Examiner*—Daniel G. Mariam
*Attorney, Agent, or Firm*—Michael S. Yatsko

[57] ABSTRACT

A visible Stokes polarimetric imager (80) that separately and contemporaneously measures each of the four separate Stokes polarization parameters of a visible light beam reflected from a scene. The imager (80) includes a compound prism assembly (50) including five prism elements (52–58). The reflected beam from the scene is collected by an input lens (84) in the imager (80), and is directed to the prism assembly (50) at a certain location. The prism elements (52–58) split the beam (82) into four separate beams (62–68) of substantially equal intensity that are emitted from the prism assembly (50) in different directions. Four separate polarimetric filters (86) and imaging devices (88) are positioned relative to the prism assembly (50) to separately receive each of the four beams (62–68) emitted from the prism assembly (50). One of the filters (86) is a neutral density filter, one of the filters only passes light that is plane polarized in the vertical direction, one of the filters only passes light as plane polarized light oriented 45° from the vertical. The last filter only passes light that is circular polarized. Thus, each of the four imaging devices (88) measures the light intensity reflected from the scene for each of the four Stokes parameters. A processing system (102) aligns and processes the video frames of data from each of the imaging devices (88) so that the relative intensity in each of the four polarized directions can be determined for each location in the scene.

20 Claims, 3 Drawing Sheets

VISIBLE STOKES POLARIMETRIC IMAGER

This invention was made with government support under Contract No. DMA 800-94-C-6008, awarded by the Department of Defense/intelligence Systems Support Office. The government has certain rights in this invention.

BACKGROUND OF THE INVENTION

1. Field of the Invention

This invention relates generally to an imaging system for generating the complete state of polarization of light reflected from a visible scene and, more particularly, to an imaging system that incorporates a compound prism assembly to separately and contemporaneously measure each of the four Stokes polarization parameters identifying the complete state of polarization of light reflected from a scene.

2. Discussion of the Related Art

There exists a need in the art to measure a two-dimensionally resolved, real-time complete polarimetric description or image of a visible scene. The ability to generate such a resolved image has many applications including military, industrial and commercial applications. These applications include the identification and classification of the scene according to various interests, such as land use, aircraft identification, atmospheric aerosol and pollutant identification and monitoring, cloud composition identification and monitoring, etc. A specific need for measuring a complete polarimetric image of a scene includes resolving an image of a water surface including breaking gravity waves.

In order to provide a complete characterization of the polarization state of light to generate the image, it is necessary to separately measure the light intensity occurring in each of the four Stokes polarization parameters. A convenient set of these polarization parameters include vertically planar polarized light, planar polarized light at 45° from the vertical, circularly polarized light, and unpolarized light. Each of the separate measurements of the Stokes polarization parameters typically must be acquired from the same scene at the same.

Conventional radar systems have made use of radar return signals to provide plane polarimetric scattering information. Microwave backscatter returns from water surfaces have long been interpreted solely in terms of Bragg scattering, known in the art, from slightly rough surfaces with possible local tilting of the surface with respect to the nominal viewing angle. This theory predicts different absolute cross-sections for backscatter of vertically polarized and horizontally polarized incident microwave radiation as a function of the irradiating wave-length, the angle of incidence, the scattering surface dielectric constant, and the power spectral density of the surface roughness at the Bragg-resonant wave number. Evidence has suggested that radar backscatter from water surfaces which include breaking waves, requires the consideration of additional scattering mechanisms that are non-Bragg in nature to describe occurrences of very large scattering cross-sections and of unexpected polarization ratios in the scattered signal. Various scattering mechanisms have been suggested based on detailed analysis of both time-averaged and time-resolved scattering signals of grazing-angle data, polarization-ratio data, wind-direction data and wind-speed dependent data. Verification of these conjectures requires a direct measurement of the scattering surface geometry that microwave scatterometers are unable to provide.

To provide the direct identification and evaluation of scattering mechanisms, it has been suggested in the art to provide a polarimetric imaging optical specular event detector (OSED) that can be used to view the same scattering surface areas as the microwave scatterometer, and provide spatially and temporarily resolved polarimetric and photometric images that are synchronized with a radar record. A plane-polarimetric imaging system operating in the visible range ($\lambda$=600 nm), synchronized to a plane-polarimetric and range-gated pulse-chirped radar (PCR) system operating at X-band ($\lambda$=3 cm), has been used to elucidate the wave structures which are present during radar backscatter spiking and super events by visual identification of the wave structures present. This system is discussed in the article Barter, J. D. and Lee, P. H. Y., "Polarimetric Optical Imaging of Scattering Surfaces," Applied Optics, Vol. 35, No. 30, Oct. 20, 1996, pp. 6015–6027, herein incorporated by reference.

FIG. 1 shows a schematic plan view of an OSED 10 of the type disclosed in the Barter article. The PCR system is not shown, but its operation is well understood in the art. A white light illumination source (not shown) illuminates the particular scene, such as the water body, and reflected light 12 is measured by the OSED 10. The OSED 10, used in conjunction with the PCR, measures only the plane polarization parameters of the scene at the different frequencies. The PCR measures the plane polarization matrix (HH, VV, VH, HV) with phase information at each of the transmitted frequencies. The returns at each frequency are combined to yield target range information under the assumption that the target does not materially alter the phase beyond the phase inversion expected at reflection from an interface with a higher permittivity medium.

The reflected light 12 is analyzed with respect to the plane of incidence which includes the reflected ray 12 and the vertical normal to the average water surface. This analysis quantifies light polarized in the horizontal direction s(H) relative to the plane of incidence and in the vertical direction p(V) relative to the plane of incidence. To improve the polarization efficiency of the OSED 10, the light 12 is sent through an infrared (IR) filter 14 to remove the infrared wave lengths, because the usable spectral bandwidth of the polarizers in the OSED 10 is significantly less than the bandwidth of the cameras. The filtered reflected light 12 impinges on a beam splitter 16, such as a partially silvered mirror, to split the light 12 into a first split beam 18 and a second split beam 20 having substantially equal intensity. A beam dump 22 is provided in the unused split path to remove ghost reflections. The first split beam 18 is reflected off of a turning mirror 24 and is sent through a vertical polarizing element 26. Substantially only the vertically polarized light in the first beam 18 passes through the polarizing element 26, and is measured by a first standard charged coupled device (CCD) black and white television camera 28. The camera 28 generates an image 30 of reflections of light in the vertically polarized direction from the scene. Likewise, the second beam 20 is sent through a horizontal polarizing element 32 so that light that is substantially only polarized in the horizontal direction in the beam 12 is measured by a second CCD black and white television camera 34. The second camera 34 generates an image 36 of reflections of light in the horizontally polarized direction from the scene. Alignment control is provided by the orientation and position of the cameras 28 and 34, the orientations of the splitter 16 and the turning mirror 24 and the relative exposure and zoom settings of two camera lenses.

The measured signals from the CCD cameras 28 and 34 are applied to an image processing board 38 that adds or subtracts the images on a pixel-by-pixel basis to yield sum and difference images of the vertical and horizontal polarization of the scene. Particularly, the image processing board 38 generates a difference image 40, a sum image 42 and a degree of polarization image 44 based on the combination of the images 30 and 36. The image 44 represents a spatial distribution of the degree of polarization of the back-scattered light obtained as the pixel-by-pixel ratio of the difference and sum images.

During wave breaking events, both before and after the crest mixes turbulently with the front surface of the wave, the radar cross-section (RCS) briefly rises orders of magnitude above the ambient Bragg scattering cross-section, and is called a spiking event. During spiking events associated with wave breaking, it is also commonly found that the HH polarization exceeds the VV polarization by as much as 15 dB in contrast with Bragg scattering for which the VV polarization always equals or exceeds the HH polarization by an amount which depends on the grazing angle. This inversion of the expected Bragg scattering polarization ratio is termed a super event.

By comparison of the synchronized time records of the OSED 10 and the PCR it has been shown that the cross-section and polarization ratios measured by the OSED 10 and the PCR are well correlated so that structures identified in the visible range can be confidently identified as the sources of the spiking and super event signatures at X-band frequencies. The radar HH polarization backscatter cross-section is seen to dominate during most of the spiking event as is routinely true for mechanically generated breaking waves. Due to the choice of collected and displayed data for this run, the cross-polarized RCS returns are not available. It is known, however, from other runs, that, while the cross-polarized returns are much higher than would be expected from purely Bragg resonant targets, they are approximately balanced (VH is approximately equal to HV) and small compared to the co-polarized returns. Since the incandescent light source for the OSED 10 is not rapidly switchable between polarization states, the scene can be illuminated with unpolarized light and the OSED returns can be compared in the s-polarization and p-polarization planes to the equivalent PCR summed returns HH+VH and VV+HV, or to HH and VV as in the case where the VH and HV returns are not available.

With the demonstration of good correlation of both the cross-section and polarization ratio between the microwave and visible diagnostics, the OSED 10 provides a useful tool for the visual identification of scattering structures which give rise to the microwave spiking and super events. The OSED images have served to demonstrate the significantly s-polarized (HH) returns from the cresting but yet unbroken wave surface, the s-polarization enhancement due to Brewster reflection from the front wave surface, and the increasing dominance of p-polarization (VV) from the aging broken crest.

Measurement of the complete Stokes parameter state-of-polarization of light over a two-dimensionally resolved image would allow the description of the target in terms of a scattering matrix. Due to the wide disparity in wavelengths between the two scattering diagnostics, it is prudent to consider the extent of the disparity even though good correlation has been demonstrated. First, the difference in wavelengths corresponds directly to a difference in roughness scale length to which the radiation will be Bragg resonant. At visible wavelengths, the population of Bragg resonant features should be negligible so that the OSED response is expected not to be sensitive to Bragg-resonant features, but to be confined to optical paths which may be constructed by standard ray-tracing methods. Similarly, the regime of diffractive scattering depends upon the probing wavelength.

Estimates of the radius of curvature of scattering objects in the field of view may be obtained by considering the local image intensity in the OSED field of view. The collected power from a single scattering object with elliptical surface curvature can be written as:

$$\Phi_{det}\left(\frac{adu}{\text{scattering element}}\right) = \frac{\rho I_s A_d}{4R^4 \kappa_1 \kappa_2} \quad (1)$$

$$\kappa_1 R, \kappa_2 R \gg 1$$

where $\Phi_{det}$ is the photon power expressed in detector digitizing units (adu), collected from the scattering element and focused to a resolution limited spot on the detector, $\rho$ is the reflectance of the water at normal incidence, $I_s$ is the source intensity in adu/steradian, $A_d$ is the effective detector aperture, R is the effective range to the scattering element, and $\kappa_1 \kappa_2$ is the Gaussian curvature of an elliptical point on the scattering element.

An effective radius of the scattering element can then be expressed as:

$$r_{eff} = \left(\frac{1}{\kappa_1 \kappa_2}\right)^{\frac{1}{2}} = 2R^2 \left(\frac{\phi_{det}}{\rho I_s A_d}\right)^{\frac{1}{2}} \quad (2)$$

Depending upon the size and distribution of the scattering elements in the image, and upon any blurring due either to optical resolution or target movement, the specular spot images from each scattering element may or may not be resolved. If the images are not resolved, then the effective probing depth in a multilayer array of scattering elements must also be considered. The collected power for each case is obtained from an integral of the image intensity over the scatterer image, and is estimated as:

$$\phi_{det} = \phi_{max}\left(\frac{adu}{pixel}\right)s\left(\frac{pixel}{\text{scattering image}}\right); \text{ resolved scattering elements} \quad (3)$$

$$\phi_{det} = \langle\phi\rangle\left(\frac{adu}{pixel}\right)s\left(\frac{pixel}{\text{resolution spot size}}\right)/\delta_p(\text{layers});$$

unresolved scattering elements where s is the relevant image size and $\delta_p$ is the effective probing depth. Using these equations, the effective radii of curvature can be estimated in the range <1–10 cm for mechanically generated 4 m braking waves. In particular, the radius of curvature estimated for the unbroken crest early in the spiking event sequence is found to be in the range 3–8 cm, which is consistent with results of wave simulation codes. In the unresolved case, the estimate for $r_{eff}$ is to be taken as an upper limit. Various methods are described in the literature for the decomposition and analysis of the scattering matrix to allow the classification of targets according to various criteria such as odd or even bounce backscatter or target symmetries.

For the PCR, the high reflectance at each air-water interface and the short attenuation length in water will ensure that the radar returns will be dominated by scattering paths which do not travel through the water. Therefore, during the later stages of wave-breaking when the returns are provided by a broken and turbulent collection of water drops and bubbles, which may be multilayered, the PCR returns will carry information only from the first layer. On the other hand, the low reflectance and long attenuation length in water at visible wavelengths may allow significant returns from deep within a multilayered structure. It would seem probable, however, that no fundamental difference in the scattering will be achieved beyond the increase of an effectively depolarized component. However, due to the limited polarimetric data acquired (two orthogonal plane polarized components), certain assumptions become necessary for the purposes of data analysis. Firstly, it must be assumed that there is no circularly polarized component. Secondly, it must be assumed that the relative magnitudes of the horizontal and vertical components either represent a rotation of the plane of polarization with no unpolarized component, or represent the degree-of-polarization with no rotation of the incident plane of polarization.

In order to fully understand the scattering process from a water body, a complete polarimetric characterization of the scattering surface is imperative. Advanced microwave systems presently provide full plane polarization transmit-receive backscatter cross-section matrices in the horizontal and vertical polarization of the scene within the antennae footprint, but a full Stokes-parameter description of a scattering scene is not easily obtained in the microwave regime. However, a Stokes-parameter imager at optical wavelengths appears to be feasible.

Because the OSED 10 only measures the reflected light 12 in the horizontal and vertical polarized direction, the OSED 10 is limited in its ability to adequately describe the scene in terms of its polarization. For example, if the OSED 10 detects equal brightness in the vertical and horizontal polarized images 30 and 36, it cannot tell the difference between a plane polarized component that's polarized at 45°, a circular polarized component, or an unpolarized component. Since the OSED 10 collects insufficient information to unambiguously determine the full state of polarization, certain assumptions must be made as to the absence of circularly polarized light or obliquely oriented plane polarized light. In addition to the obvious difficulty of extending the separate camera system and TV-based signal archive method in the OSED 10 to four channels, the optical alignment of the OSED 10 is delicate and limited in the quality of image congruence by variation in the image distortions introduced by the separate zoom lens optics. The image quality is further degraded by the limited available bandwidth of the color channels and by the interlaced raster format of the TV video recording.

What is needed is an imaging device that measures a two-dimensionally resolved, real-time complete polarimetric description of a visible scene in the optical range. It is therefore an object of the present invention to provide such an imager.

SUMMARY OF THE INVENTION

In accordance with the teachings of the present invention, a visible Stokes polarimetric imager is disclosed that separately and contemporaneously measures each of the four separate Stokes polarization parameters of visible light reflected from a scene. The imager includes a compound prism assembly including five prism elements. The reflected light from the scene is collected by the imager and is directed to the prism assembly at a certain location. The prism elements split the light beam into four separate light beams of substantially equal intensity that are then emitted from the prism assembly in different directions. Four separate polarimetric filters and imaging devices are positioned relative to the prism assembly to separately receive each of the four beams emitted from the prism assembly. One of the filters is a neutral density filter, one of the filters only passes light that is plane polarized in the vertical direction, one of the filters only passes light that is plane polarized in a plane 45° from the vertical direction and the last filter only passes light that is right circularly polarized. Thus, each of the four imaging devices separately measures the light intensity reflected from the scene for each of the four Stokes parameters. A processing system aligns and processes the video frames of data from each of the imaging devices so that the relative intensity in each of the four polarized directions can be determined for each location in the scene.

Additional objects, advantages, and features of the present invention will become apparent from the following description and appended claims, taken in conjunction with the accompanying drawings.

DETAILED DESCRIPTION OF THE PREFERRED EMBODIMENTS

The following description of the preferred embodiments directed to a visible Stokes polarimetric imager is merely exemplary in nature, and is in no way intended to limit the invention or its applications or uses.

According to the invention, an upgrade to the OSED 10, described above, which will measure the four Stokes parameter state-of-polarization over a two-dimensional image acquired in real time is disclosed. The imaging polarimetric instrument of the invention separately measures each of the four Stokes polarization parameters relative to the plane of incidence of light reflected from the scene. For example, if the instrument is positioned directly above a body of water, the plane of incidence is vertical off of the water and contains the reflected and received light rays. The instrument measures each of the four Stokes polarization parameters in the reflected light to give the state of polarization of any feature in the field of view. The instrument can be portable and rugged, suitable for deployment in field trials and operated either passively or with active illumination.

Figure 1:
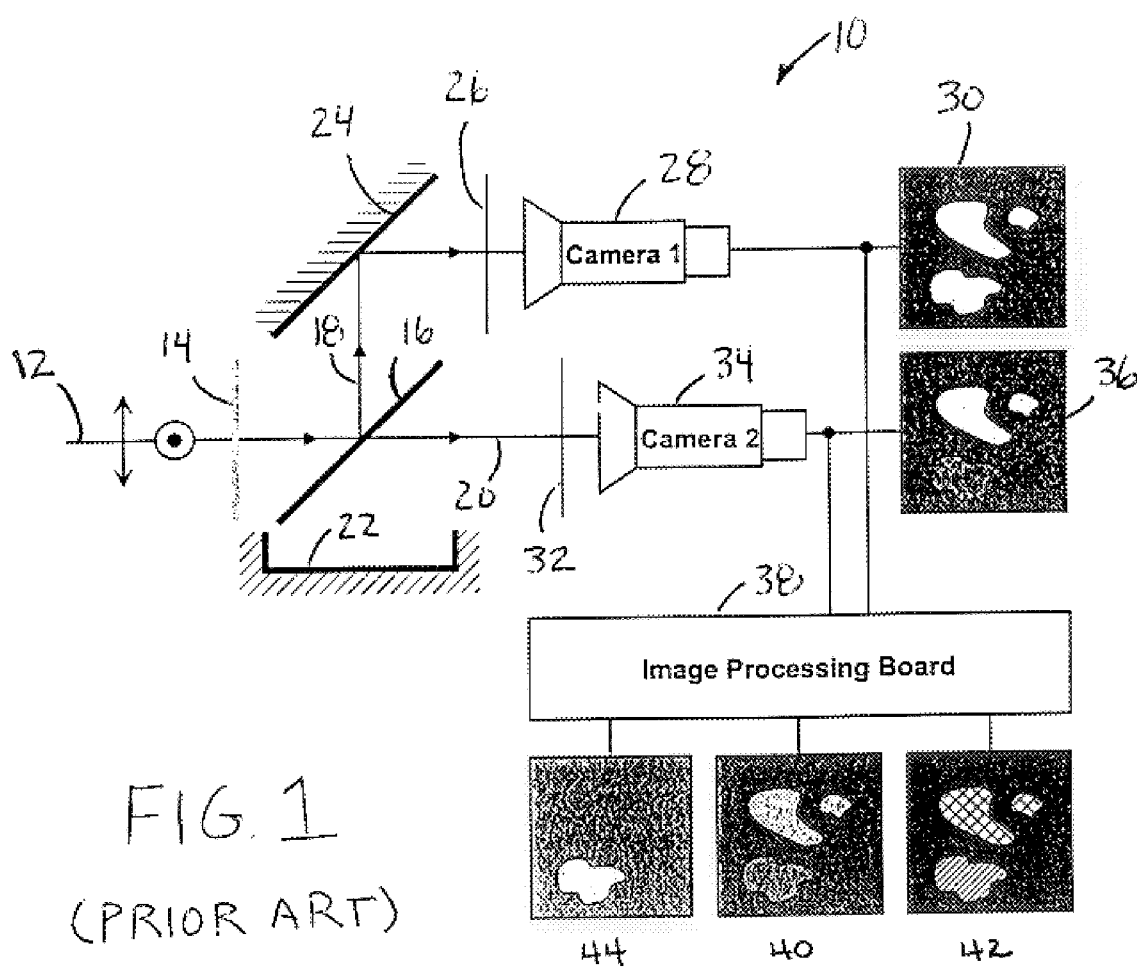
FIG. 1 is a schematic plan view of a known optical specular event detector.
Figure 2:
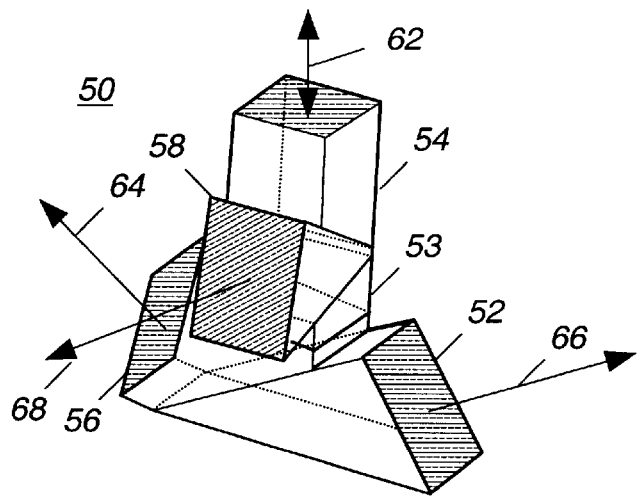
FIG. 2 is a perspective view of a 4-output beam prism assembly known in the art.
Figure 3:
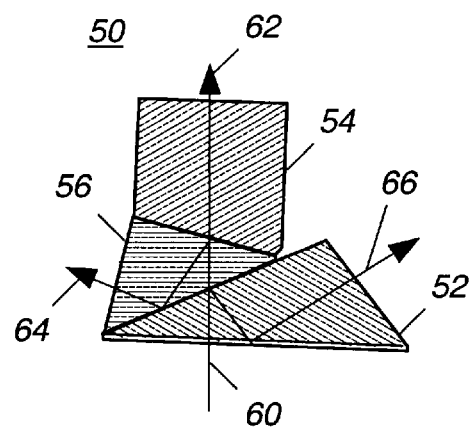
FIG. 3 is a side view of a similar 3-output beam prism assembly to that shown in FIG. 2.
Figure 4:
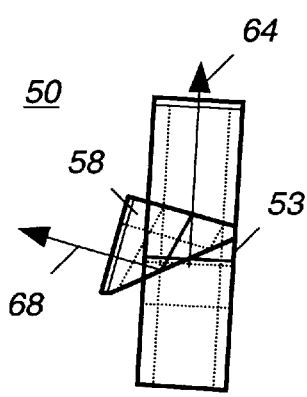
FIG. 4 is an end view of the prism assembly shown in FIG. 2.

The imaging polarimetric instrument of the invention makes use of a compound prism assembly 50, as shown in FIGS. 2–4 in one embodiment. The prism assembly 50 is a four output beam prism assembly available from Richter Enterprises, Inc. of Albuquerque, N. Mex., and has a known use in an opto-mechanical assembly with CCD mounts. One particular use is in connection with a color television camera. The prism assembly 50 is comprised of four separate, specially configured prism elements 52, 53, 54, 56 and 58 that are combined and arranged as shown to provide internal reflections of an optical beam within the assembly 50 to emit four optical output beams of generally equal intensity. The separate prism elements 52–58 are secured together by a suitable optical cement. The assembly 50 is made of a suitable optical quality glass or plastic.

An optical input beam 60 impinges on the bottom surface of the prism element 52 at a predetermined location, and a portion of the input beam 60 is emitted from an output face of the prism element 54 as a first beam portion 62. A second beam portion of the beam 60 is reflected off an interface between the element 53 and the element 56 and an interface between the element 52 and the element 56, and is emitted from the assembly 50 through an output face of the element 56. A third beam portion 66 of the input beam 60 is reflected off an interface between the elements 52 and 56, and is reflected off a bottom surface of the element 52 to be emitted from an output face of the element 52. A fourth beam portion 68 is reflected off of an interface between the prism elements 54 and 58, and is emitted from the prism assembly 50 through an output face of the prism element 58. The configuration of the prism elements 52–58 provide four output beams 62–68 from the single input beam 60 that travel in four different directions, and have substantially equal intensity.

Figure 5:
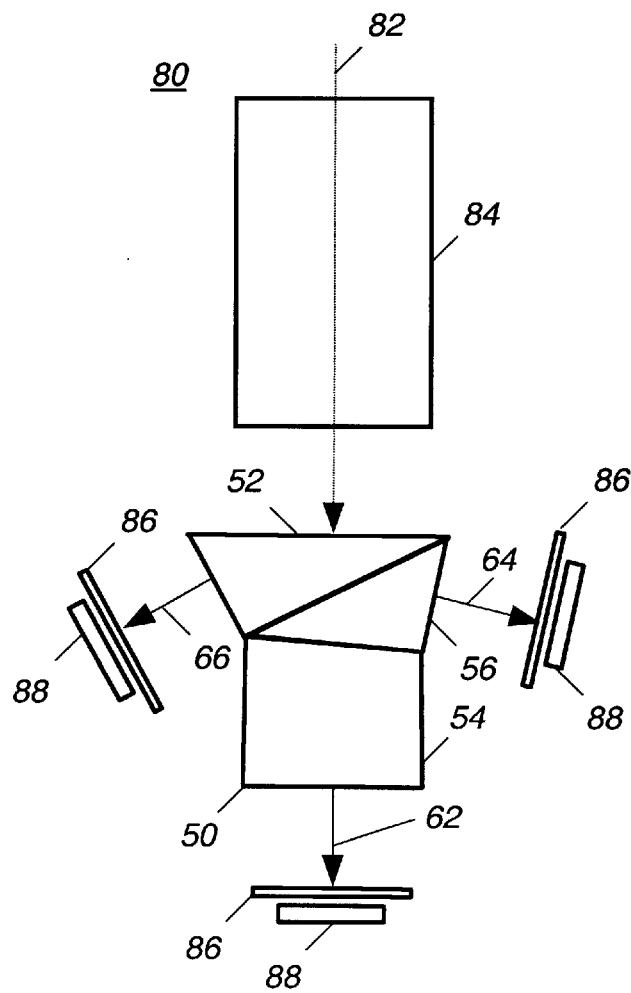
FIG. 5 is a schematic plan view of a visible Stokes polarimetric imager, incorporating the prism assembly shown in FIG. 2, according to an embodiment of the present invention.

The prism assembly 50 is incorporated into a visible Stokes polarimetric imager (VISPI) 80, according to an embodiment of the present invention, as shown in FIG. 5. A white light source (not shown) can be used to illuminate the scene, or the VISPI 80 can operate passively on ambient reflected light. A visible light beam 82 reflected from a scene to be measured is collected by a lens assembly 84. The lens assembly 84 can be any lens assembly suitable for the purposes of the particular use of the VISPI 80, and typically will be a zoom type lens assembly for focusing purposes and adjusting the field of view. A single lens assembly 84 serves the entire VISPI 80 so that any slight image distortions introduced by the optics in the lens assembly 84 will be reproduced accurately throughout the system 80.

The reflected beam 82 travels through the lens assembly 84, and is directed to the prism assembly 50 so that it impinges on the prism element 52 at the appropriate location, just as the input beam 60 discussed above. The prism assembly 50 splits the beam 82 into the four equal intensity beam portions 62–68 that are emitted from the prism assembly 50 in different directions, as discussed above. The fourth beam portion 68 is not shown in FIG. 5 because it is not in the plane of the paper. Each beam portion 62–68 is sent to a separate polarizing element 86 that passes only the light in the beam 82 that is polarized in the direction associated with the particular polarizing element 86. Therefore, by providing one polarizing element that only passes vertically planar polarized light, one polarizing element that only passes planar polarized light in the plane 45° to the vertical, one polarizing element that only passes circularly polarized light, and one polarizing element that passes unpolarized light, four output beams of equal intensity carrying information of the same scene at the same time are generated that define each of the separate Stokes parameters. To provide the four separately polarized light beams, a neutral density (gray) filter will be provided for the unpolarized light, two plane polarizing filters, one in the vertical direction and one 45° from the vertical direction will be provided, and a circularly polarizing filter will be provided. The polarizing elements 86 can be any suitable polarizing element known in the art that provides the desired polarized filtering. The position of each separate filter relative to the prism assembly 50 may have certain advantages for different polarimetric imagers depending on the particular application.

A separate suitable imaging device 88, such as a CCD, is provided adjacent to each of the polarizing element 86 to receive the light beam in a particular polarization state, and to provide an image of just that beam. The imaging devices 88 generate an electrical signal indicative of the image of only the light in that polarization state. Therefore, four separate images are generated by the VISPI 80 that are measurements of each of the separate four Stokes polarization parameters of the reflected light. According to the invention, each of the polarizing elements 86 and the imaging devices 88 are adjustable relative to the prism assembly 50 for image alignment purposes. The imaging devices 88 need to be aligned so that the lens assembly 84 focuses the image on the devices 88, and must be aligned in a transverse direction to ensure that the same element in the field of view maps to the same pixel of each of the imaging devices 88.

Figure 6:
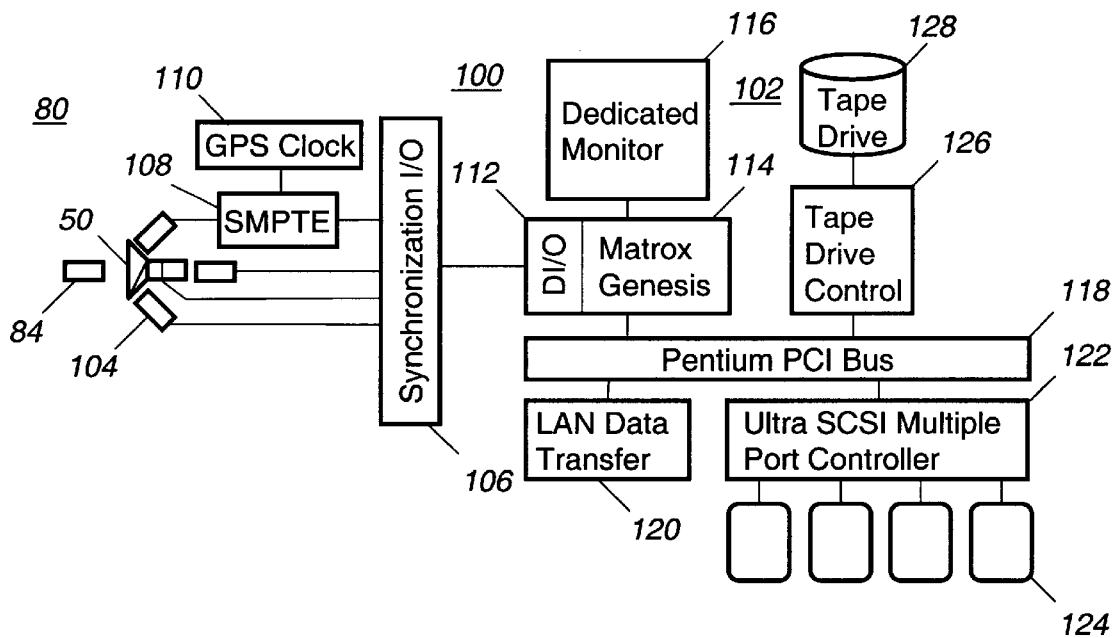
FIG. 6 is a schematic plan view of an imaging system including the imager shown in FIG. 5, according to an embodiment of the present invention.

FIG. 6 shows a schematic block diagram of a VISPI system 100 that includes the VISPI 80 and a suitable processor 102. Each separate combination of polarizing element 86 and imaging device 88 is shown as a single imaging system 104. Only three of the four imaging systems 104 are depicted as the fourth is out of the plane of the paper. The video data stream from the imaging systems 104 will be non-interlaced digital gray-scale electrical data, in one embodiment. The imaging systems 104 give a relative measurement of the intensity of light for each pixel in the image separately for each of the planar polarized component 45° from vertical, the vertically planar polarized component, the circularly polarized component, and the total received light. Measurement of each of the four Stokes parameters allows the characteristics of objects in the scene to be identified, such as the number of bounces on reflection, shape of objects, etc. Electrical output signals from the imaging systems 104 are sent to a synchronization input/output (I/O) 106 in the processor 102. The synchronization I/O 106 receives the frame- and line-synchronized digital pixel data from all imaging systems 104 and passes pixel-synchronized data to the data processor 102. A SMPTE format time code 108 obtained from a global positioning system (GPS) receiver is inserted in the data stream from one imaging system 104 to provide synchronization with other diagnostic systems. The GPS clock signal is used because it is a currently available, highly accurate clock system. The output from the synchronization I/O 106 includes digital video output from all of the imaging systems 104 in a compact format.

A Matrox Genesis board 114 with digital I/O 112, known to those skilled in the art, captures the frames of digital data representing the scene from the synchronization I/O 106. The board 114 processes the video information to display the information, perform pixel-by-pixel subtractions and divisions, or other desirable data manipulation. The board 114 will acquire the four separate eight-bit video streams of data at thirty frames per second and combine them into one thirty-two-bit word for each pixel, in one embodiment. Data output from the board 114 can be displayed on a dedicated monitor 116. Additionally, the information from the board 114 is passed to a PCI bus 118 to be sent to additional processing components, and storage facilities. A local area network (LAN) data transfer system 120 is provided to transfer the video data to other computers (not shown), if desirable. The video data on the bus 118 is also sent to an ultra SCSI multiple port controller 122 for further distribution of the data. The SCSI controller 122 acts as a hard disk array controller to stream the data to disk in real time. The controller 122 multiplexes the data to the four disks such as the known Barracuda hard disks of the hard disk array 124 so that the system can sustain 80 MB data transfer rates with 38 GB capacity. When data is not being actively acquired from the VISPI 80 system, data may be archived from the hard disk array 124 to the tape drive 128 via the data bus 118 and the tape drive control 126. In addition to data acquisition, the board 114 will process and display polarization images extracted from the data stream to disk, or, in an off-line mode, retrieved from the disk arrays 124.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An imaging system for generating polarimetric images of a scene, said system comprising:

an input lens, said input lens receiving reflected input radiation from the scene and providing an image of the scene;

an optical assembly, said optical assembly receiving the input radiation from the input lens, said optical assembly separating the input radiation into at least four separate output radiation beams, each of the four output beams being of substantially the same intensity where each beam includes radiation representative of the entire scene;

at least four polarimetric filters, a separate polarimetric filter receiving each of the output beams from the optical assembly, a first of the polarimetric filters passing plane polarized light in a first one of the output beams, a second of the polarimetric filters passing vertically polarized light in a second one of the output beams, a third of the polarimetric filters passing circularly polarized light in a third one of the output beams, and at least four imaging devices, a separate one of the imaging devices receiving each one of the output beams from the four polarimetric filters, said imaging devices separately generating electrical signals indicative of output images of the entire scene; and a controller, said controller receiving the electrical signals from the imaging devices and providing output information of the state of polarization of the radiation reflected from the scene.

2. The system according to claim 1 wherein the optical assembly is a compound prism assembly, said prism assembly including at least four prism elements.

3. The system according to claim 2 wherein a separate one of the prism elements outputs each one of the four output beams from the prism assembly in a separate direction.

4. The system according to claim 1 wherein the imaging devices are CCD cameras.

5. The system according to claim 1 wherein the input lens is a zoom lens, said zoom lens adjusting the field of view of the imaging system.

6. The system according to claim 1 wherein the controller includes a GPS receiver for receiving a GPS signal, said controller using a clock signal from the GPS signal for timing purposes.

7. The system according to claim 1 wherein the controller includes a synchronizer, said synchronizer synchronizing frames of video data from the imaging devices.

8. The system according to claim 1 wherein the controller includes a processing system, said processing system comparing the signals from the imaging devices and providing output data of the relative comparison of the light intensity for each of the horizontally polarized light, vertically polarized light, circularly polarized light and unpolarized light reflected from the scene.

9. The system according to claim 1 wherein the input radiation is visible light.

10. An imaging system comprising:

an optical assembly, said optical assembly receiving radiation from a scene, said optical assembly separating the radiation into four separate output radiation beams of substantially the same intensity where each beam includes radiation representative of the entire scene;

four polarimetric filters, a separate one of the polarimetric filters receiving a separate one of the output beams from the optical assembly, said polarimetric filters separately passing each one of a Stokes polarization parameters in the output beams; and four imaging devices, a separate one of the imaging devices receiving each one of the output beams from the four polarimetric filters, said imaging devices generating electrical signals indicative of output images from the entire scene.

11. The system according to claim 10 wherein the optical assembly is a compound prism assembly, said prism assembly including at least four prism elements.

12. The system according to claim 11 wherein a separate one of the prism elements outputs each one of the four output beams from the prism assembly in a different direction.

13. The system according to claim 10 wherein the radiation from the scene is visible light.

14. The system according to claim 10 further comprising an input lens, said input lens receiving reflected radiation from the scene and providing a field of view of the imaging system, said optical assembly receiving the radiation from the input lens.

15. The system according to claim 10 further comprising a controller, said controller receiving electrical signals from the imaging devices and processing the electrical signals to provide a determination of the Stokes polarimetric parameters.

16. A method of generating an image of a scene, said method comprising the steps of:

collecting reflected radiation from a scene;

directing the collected radiation from the scene to an optical assembly, said optical assembly separating the radiation into four separate output radiation beams of substantially the same intensity where each beam includes radiation representative of the entire scene;

directing each of the four separate output radiation beams to four separate polarimetric filters such that a separate one of the polarimetric filters receives a separate one of the output beams from the optical assembly, said polarimetric filter separately passing each one of a Stokes polarization parameters in the output beams; and directing the output beams from the polarimetric filters to four separate imaging devices, where a separate one of the imaging devices receives each one of the output beams from the polarimetric filters, said imaging devices generating electrical signals indicative of output images from the entire scene.

17. The method according to claim 16 wherein the step of directing the radiation from the scene to an optical assembly includes directing the radiation from the scene to a compound prism assembly that includes at least four prism elements, where a separate one of the prism elements outputs each one of the four output beams from the prism assembly in a different direction.

18. The method according to claim 16 wherein the step of collecting radiation from a scene includes collecting visible light reflected from a scene.

19. The method according to claim 16 wherein the step of collecting radiation from the scene includes collecting radiation from the scene in an input lens where the input lens provides a field of view and focuses the output beams on the imaging devices.

20. The method according to claim 16 further comprising the step of directing the electrical signals from the imaging devices to a controller where the controller processes the electrical signals to provide a determination of the Stokes polarimetric parameters.

* * * * *